(12) United States Patent
Caprioli et al.

(10) Patent No.: US 7,213,133 B2
(45) Date of Patent: *May 1, 2007

(54) METHOD AND APPARATUS FOR AVOIDING WRITE-AFTER-WRITE HAZARDS IN AN EXECUTE-AHEAD PROCESSOR

(75) Inventors: Paul Caprioli, Mountain View, CA (US); Shailender Chaudhry, San Francisco, CA (US)

(73) Assignee: Sun Microsystems, Inc, Santa Clara, CA (US)

( * ) Notice: Subject to any disclaimer, the term of this patent is extended or adjusted under 35 U.S.C. 154(b) by 393 days.

This patent is subject to a terminal disclaimer.

(21) Appl. No.: 10/923,217

(22) Filed: Aug. 20, 2004

(65) Prior Publication Data

US 2005/0251664 A1 Nov. 10, 2005

Related U.S. Application Data

(60) Provisional application No. 60/567,835, filed on May 3, 2004.

(51) Int. Cl.
*G06F 9/30* (2006.01)
(52) U.S. Cl. .................... 712/228; 712/218
(58) Field of Classification Search ............ 712/207, 712/225, 218, 228; 711/137
See application file for complete search history.

(56) References Cited

U.S. PATENT DOCUMENTS

| | | | |
|---|---|---|---|
| 6,470,445 B1 | 10/2002 | Arnold et al. ............ | 712/218 |
| 2002/0087794 A1* | 7/2002 | Jouppi et al. ............ | 711/126 |
| 2003/0120902 A1 | 6/2003 | Kottapalli et al. ........ | 712/216 |
| 2003/0135713 A1 | 7/2003 | Rychlik et al. ........... | 712/217 |

FOREIGN PATENT DOCUMENTS

| WO | WO 2004/059472 A2 | 7/2004 |
|---|---|---|
| WO | WO 2005/106648 A2 | 11/2005 |

OTHER PUBLICATIONS

"Beating in-order stalls with "flea-flicker" two-pass pipelining", by Ronald D. Barnes et al., Proceedings of the 36th International Symposium on Microarchitecture, 2003 IEEE.

* cited by examiner

*Primary Examiner*—Richard L. Ellis
(74) *Attorney, Agent, or Firm*—Park, Vaugham & Fleming, LLP

(57) ABSTRACT

One embodiment of the present invention provides a system that avoids write-after-write (WAW) hazards while speculatively executing instructions. The system starts in a normal execution mode, wherein the system issues instructions for execution in program order. Upon encountering an unresolved data dependency during execution of an instruction, the system generates a checkpoint, defers the instruction, and executes subsequent instructions in an execute-ahead mode. During this execute-ahead mode, instructions that cannot be executed because of unresolved data dependencies are deferred, and other non-deferred instructions are executed in program order. If an unresolved data dependency is resolved during the execute-ahead mode, the system moves into a deferred mode wherein the system executes deferred instructions. While executing a deferred instruction, if dependency information for an associated destination register indicates that a WAW hazard potentially exists with a following non-deferred instruction, the system executes the deferred instruction to produce a result, and forwards the result to be used by subsequent instructions in a pipeline and/or deferred queue for the processor. The system does so without committing the result to the architectural state of the destination register. In this way, the system makes the result available to the subsequent instructions without overwriting a result produced by the following non-deferred instruction, thereby avoiding a WAW hazard.

25 Claims, 6 Drawing Sheets

METHOD AND APPARATUS FOR AVOIDING WRITE-AFTER-WRITE HAZARDS IN AN EXECUTE-AHEAD PROCESSOR

RELATED APPLICATIONS

This application hereby claims priority under 35 U.S.C. §119 to U.S. Provisional Patent Application No. 60/567,835, filed on 3 May 2004, entitled "Method and Apparatus for Avoiding WAW Hazards in an Execute-Ahead Processor," by inventors Paul Caprioli and Shailender Chaudhry.

The subject matter of this application is related to the subject matter in a co-pending non-provisional application entitled, "Method and Apparatus for Avoiding RAW Hazards in an Execute-Ahead Processor," by inventors Shailender Chaudhry, Paul Caprioli and Marc Tremblay, having Ser. No. 10/923,219, and filing date Aug. 20,2 004. The subject matter of this application is also related to the subject matter in a co-pending non-provisional application entitled, "Method and Apparatus for Avoiding WAR Hazards in an Execute-Ahead Processor," by inventors Shailender Chaudhry, Paul Caprioli and Marc Tremblay, having Ser. No. 10/923,218, and filing date Aug. 20, 2004.

BACKGROUND

1. Field of the Invention

The present invention relates to techniques for improving computer system performance. More specifically, the present invention relates to a method and an apparatus for avoiding hazards involving data dependencies in a processor that supports speculative program execution.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, and is beginning to create significant performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

Efficient caching schemes can help reduce the number of memory accesses that are performed. However, when a memory reference, such as a load operation generates a cache miss, the subsequent access to level-two (L2) cache or memory can require dozens or hundreds of clock cycles to complete, during which time the processor is typically idle, performing no useful work.

A number of techniques are presently used (or have been proposed) to hide this cache-miss latency. Some processors support out-of-order execution, in which instructions are kept in an issue queue, and are issued "out-of-order" when operands become available. However, allowing instructions to issue out-of-order greatly increases the complexity of a processor, because the processor must provide mechanisms to avoid problems caused by data dependencies between instructions that execute out-of-order. These inter-instruction data dependencies give rise to a number of problems, such as read-after-write (RAW) hazards, write-after-write (WAW) hazards, and write-after-read (WAR) hazards.

Conventional out-of-order processors deal with RAW hazards by structuring an issue queue as a content-addressable-memory (CAM). Unfortunately, this type of CAM structure has a complexity that grows quadratically with the number of entries in the issue queue and the issue width of the processor. Moreover, performance considerations make it highly desirable to pick ready consumer instructions in the same cycle as producers make the data available. This factor along with the timing constraints introduced by higher clock frequencies limits the size of the issue queue to 128 or fewer entries, which is not sufficient to hide memory latencies as processors continue to get faster.

Conventional out-of order machines deal with WAW and WAR hazards through register renaming. In a system that supports register renaming, producer instructions specify architectural registers as their destinations, and these architectural registers are mapped by hardware onto unique physical registers. This eliminates WAW and WAR hazards, because the unique physical register cannot be overwritten by another producer instruction. Unfortunately, the register renaming circuitry is also structured as a CAM, which similarly has a complexity that grows quadratically with the number of entries in the issue queue and with the issue width of the processor. Furthermore, constraints on the number of physical registers which are available for register renaming purposes also limits the size of the issue queue.

Hence, what is needed is a method and an apparatus for hiding memory latency and dealing with data dependencies without the above-described drawbacks of existing processor designs.

SUMMARY

One embodiment of the present invention provides a system that avoids write-after-write (WAW) hazards while speculatively executing instructions on a processor that is operating in execute-ahead mode. The system starts in a normal execution mode, wherein the system issues instructions for execution in program order. Upon encountering an unresolved data dependency during execution of an instruction, the system generates a checkpoint. Next the system defers the instruction and executes subsequent instructions in an execute-ahead mode. During this execute-ahead mode, instructions that cannot be executed because of unresolved data dependencies are deferred, and other non-deferred instructions are executed in program order. Furthermore, dependency information is maintained for each register indicating whether or not a value in the register depends on an unresolved data dependency.

If an unresolved data dependency is resolved during the execute-ahead mode, the system moves into a deferred mode wherein the system executes deferred instructions. Deferred instructions that are ready to be executed are executed in program order, and other deferred instructions that still cannot be executed because of unresolved data dependencies are deferred again. While executing a deferred instruction, if dependency information for an associated destination register indicates that a WAW hazard potentially exists with a following non-deferred instruction, the system executes the deferred instruction to produce a result, and forwards the result to be used by subsequent instructions in a pipeline and/or deferred queue for the processor. However, the system does so without committing the result to the architectural state of the destination register. In this way, the system makes the result available to the subsequent instructions without overwriting a result produced by the following non-deferred instruction, thereby avoiding a WAW hazard.

In a variation on this embodiment, the dependency information maintained for each register includes a "not-there" bit, which indicates whether or not a value to be stored in the register by a preceding instruction is subject to an unresolved data dependency and is consequently not available. Furthermore, while executing an instruction during the execute-ahead mode, the system sets the not-there bit of the destination register for the instruction if a value to be stored in the destination register is "not-ready," or if any source operand of the instruction is not-there.

In a further variation, the dependency information maintained for each register also includes a "write" bit, which indicates whether or not a value to be stored in the register during the deferred mode is subject to an unresolved data dependency. While executing a deferred instruction during the deferred mode, the systems sets the write bit of the destination register for the instruction if a value to be stored in the destination register is "not-ready," or if any source operand of the instruction has a write bit that is set.

In a variation on this embodiment, dependency information for the destination register indicates that a WAW hazard potentially exists if the not-there bit of the destination register is clear. This indicates that a following (but previously executed) non-deferred instruction must have cleared the not-there bit because the not-there bit was previously set when the deferred instruction was initially deferred. In this case, a WAW hazard potentially exists between the deferred instruction and the following non-deferred instruction.

In a variation on this embodiment, an operand is not-ready if the operand has not returned from: a preceding load miss, a preceding translation lookaside buffer (TLB) miss, or a preceding full or partial read-after-write (RAW) from store buffer operation.

In a variation on this embodiment, if some deferred instructions are deferred again, the system updates the not-there bit of each register with the AND of the not-there bit and the write bit of the register The system also clears the write bit of each register, and returns to execute-ahead mode at the point where execute-ahead mode left off.

In a further variation, deferring an instruction involves inserting the instruction into a deferred queue, which contains deferred instructions in program order.

In a variation on this embodiment, if all deferred instructions are executed in the deferred mode, the system returns to the normal execution mode to resume normal program execution from the point where the execute-ahead mode left off.

In a variation on this embodiment, if a non-data-dependent stall condition is encountered in normal execution mode, the system generates a checkpoint that can subsequently be used to return execution of the program to the point of the non-data-dependent stall condition. Next, the system enters a scout mode, wherein instructions are speculatively executed to prefetch future memory operations, but wherein results are not committed to the architectural state of the processor. When the non-data-dependent stall condition that caused the processor to move out of normal execution mode is finally resolved, the system uses the checkpoint to resume execution in normal execution mode from the instruction that originally encountered the non-data-dependent stall condition.

In a variation on this embodiment, if a non-data-dependent stall condition is encountered in execute-ahead mode, the system enters a scout mode, wherein instructions are speculatively executed to prefetch future memory operations, but wherein results are not committed to the architectural state of the processor. When the unresolved data dependency that originally caused the processor to move out of normal execution mode is finally resolved, the system uses the checkpoint to resume execution in normal execution mode from the instruction that originally encountered the unresolved data dependency.

In a variation on this embodiment, generating the checkpoint involves saving a precise architectural state of the processor to facilitate subsequent recovery from exceptions that arise during the execute-ahead mode or the deferred mode.

In a variation on this embodiment, the unresolved data dependency can include: a use of an operand that has not returned from a preceding load miss; a use of an operand that has not returned from a preceding translation lookaside buffer (TLB) miss; a use of an operand that has not returned from a preceding full or partial read-after-write (RAW) from store buffer operation; and a use of an operand that depends on another operand that is subject to an unresolved data dependency.

One embodiment of the present invention provides a system that avoids read-after-write (RAW) hazards while speculatively executing instructions on a processor. The system starts in a normal execution mode, wherein the system issues instructions for execution in program order. Upon encountering a stall condition during execution of an instruction, the system generates a checkpoint, and executes the instruction and subsequent instructions in a speculative-execution mode. The system also maintains dependency information for each register indicating whether or not a value in the register depends on an unresolved data-dependency. The system uses this dependency information to avoid RAW hazards during the speculative-execution mode.

In a variation on this embodiment, maintaining dependency information for each register involves maintaining a "not-there" bit for each register, indicating whether a value in the register can be resolved. During execute-ahead mode, the system sets the not-there bit of a destination register for a memory reference if the memory reference has not returned a value to the destination register. The system also sets the not-there bit of a destination register for an instruction if the not-there bit of any corresponding source register for the instruction is set. The system clears the not-there bit of a destination register for an instruction that successfully executes without encountering an unresolved data dependency.

In a variation on this embodiment, the speculative-execution mode is a scout mode, wherein instructions are speculatively executed to prefetch future memory operations, but wherein results are not committed to the architectural state of the processor. In this variation, when the stall condition that caused the processor to enter the scout mode is finally resolved, the system uses the checkpoint to resume execution in the normal execution mode from the instruction that originally encountered the stall condition.

In a variation on this embodiment, the stall condition is a data-dependent stall condition, and the speculative-execution mode is an execute-ahead mode, wherein instructions that cannot be executed because of an unresolved data dependency are deferred, and wherein other non-deferred instructions are executed in program order.

In a variation on this embodiment, using the dependency information to avoid RAW hazards during the speculative-execution mode involves deferring instructions that are subject to unresolved data dependencies.

In a variation on this embodiment, using the dependency information to avoid RAW hazards during the speculative-execution mode involves ignoring the results of instructions that are subject to unresolved data dependencies.

One embodiment of the present invention provides a system that avoids write-after-read (WAR) hazards while speculatively executing instructions on a processor. The system starts in a normal execution mode, wherein the system issues instructions for execution in program order. Upon encountering an unresolved data dependency during execution of an instruction, the system generates a checkpoint, defers the instruction, and executes subsequent instructions in an execute-ahead mode, wherein instructions that cannot be executed because of unresolved data dependencies are deferred, and wherein other non-deferred instructions are executed in program order. While deferring the instruction, the system stores the instruction along with any resolved source operands for the instruction into a deferred buffer.

If an unresolved data dependency is resolved during the execute-ahead mode, the system executes deferred instructions in a deferred mode, wherein deferred instructions that are able to be executed are executed in program order, and wherein other deferred instructions that still cannot be executed because of unresolved data dependencies are deferred again. Executing a deferred instruction involves using resolved source operands from the deferred buffer, if such resolved source operands were previously stored along with the instruction in the deferred buffer. In this way, instructions following the deferred instruction that overwrite the resolved source operands cannot create a WAR hazard.

In a variation on this embodiment, the deferred buffer is organized as a first-in first-out queue.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Processor

Figure 1:
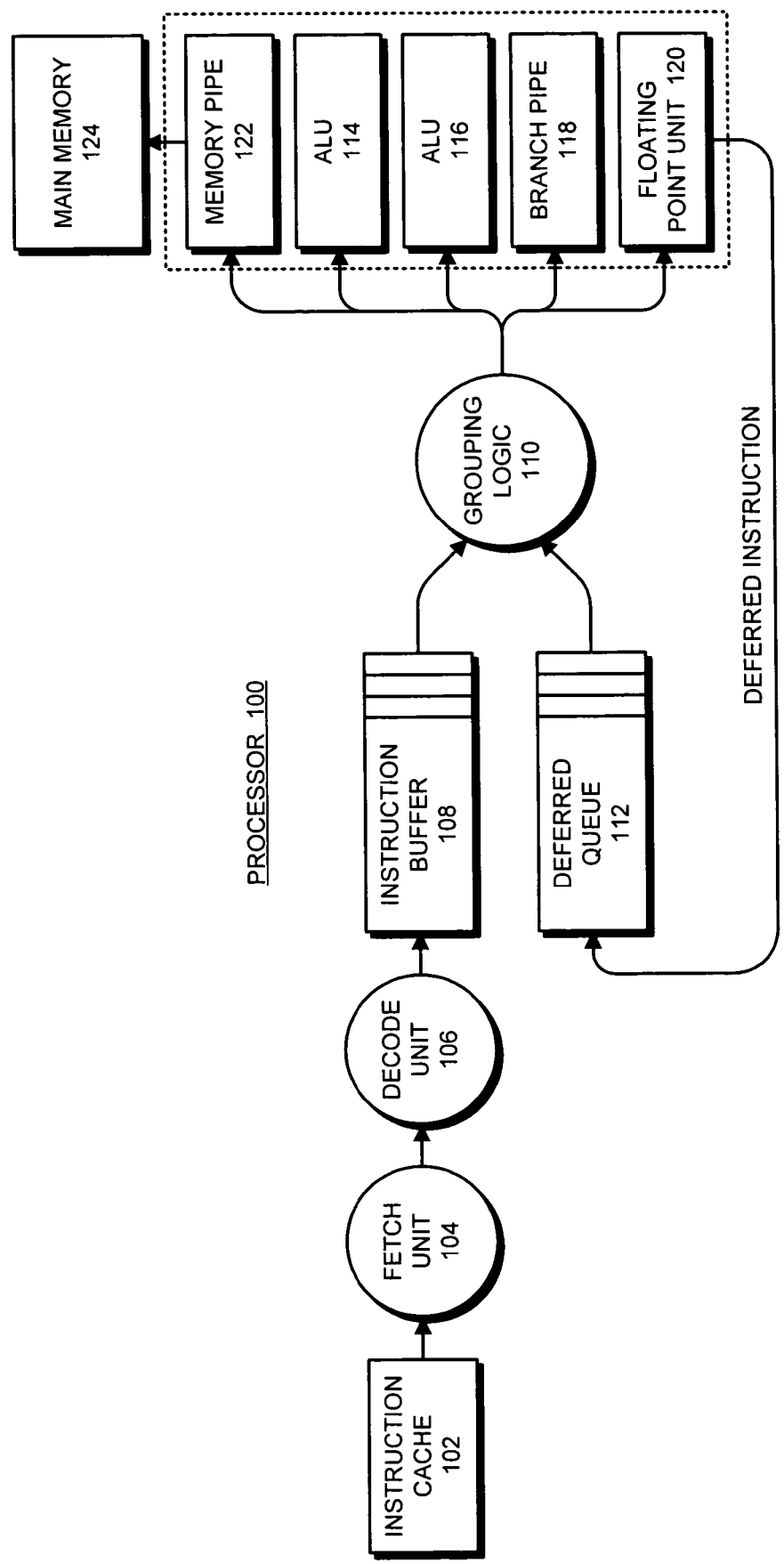
FIG. 1 illustrates a processor in accordance with an embodiment of the present invention.

FIG. 1 illustrates the design of a processor 100 in accordance with an embodiment of the present invention. Processor 100 can generally include any type of processor, including, but not limited to, a microprocessor, a mainframe computer, a digital signal processor, a personal organizer, a device controller and a computational engine within an appliance. As is illustrated in FIG. 1, processor 100 includes instruction cache 102, fetch unit 104, decode unit 106, instruction buffer 108, deferred queue 112, grouping logic 110, memory 124, arithmetic logic unit (ALU) 114, ALU 116, branch pipe 118, floating point unit 120 and memory pipe 122.

During operation, fetch unit 104 retrieves instructions to be executed from instruction cache 102, and feeds these instructions into decode unit 106. Decode unit 106 forwards the instructions to be executed into instruction buffer 108, which is organized as a FIFO buffer. Instruction buffer 108 feeds instructions in program order into grouping logic 110, which groups instructions together and sends them to execution units, including memory pipe 122 (for accessing memory 124), ALU 114, ALU 116, branch pipe 118 (which resolves control transfer computations), and floating point unit 120.

If an instruction cannot be executed due to an unresolved data dependency, such as an operand that has not returned from a load operation, the system defers execution of the instruction and moves the instruction into deferred queue 112. Note that like instruction buffer 108, deferred queue 112 is also organized as a FIFO buffer.

When the data dependency is eventually resolved, instructions from deferred queue 112 are executed in program order with respect to other deferred instructions, but not with respect to other previously executed non-deferred instructions. This process is described in more detail below with reference to FIG. 5.

Buffers

Figure 2:
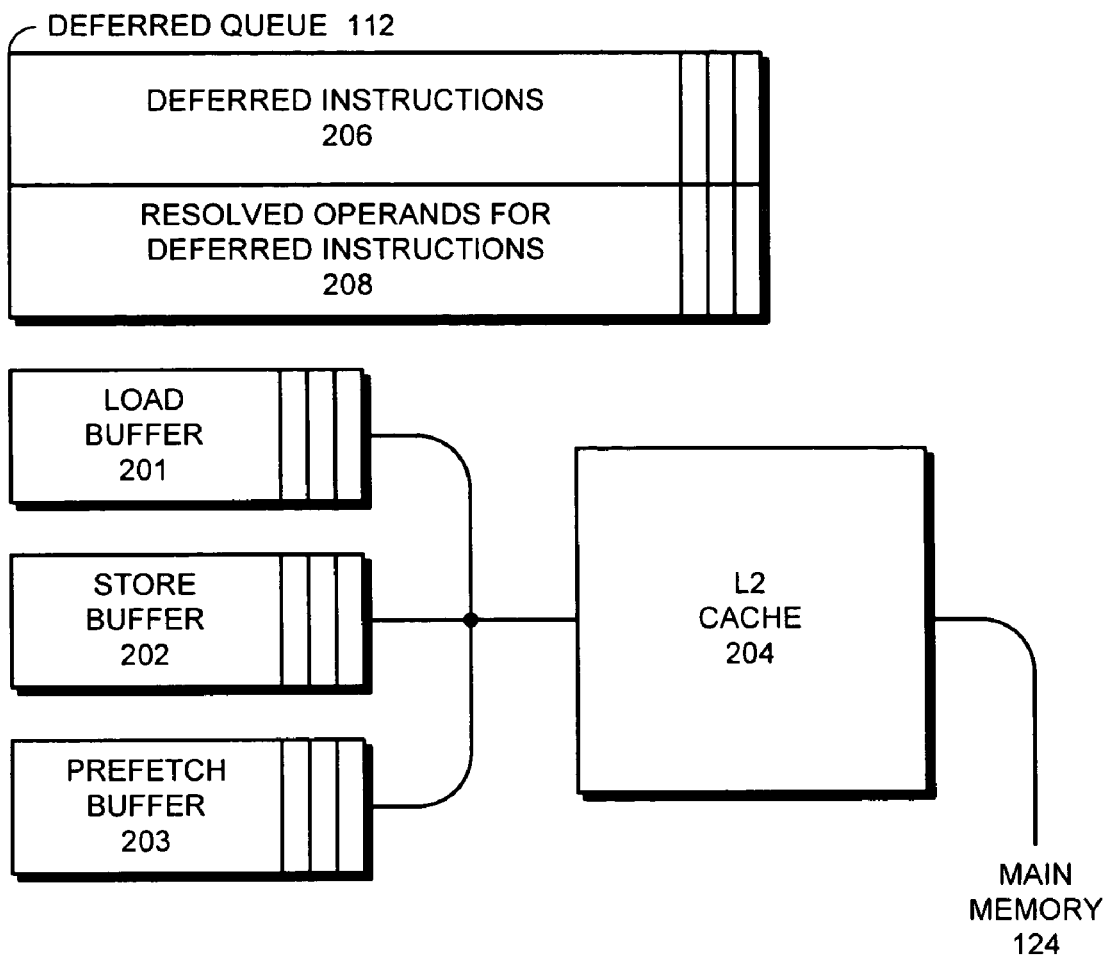
FIG. 2 illustrates various buffers within a processor in accordance with an embodiment of the present invention.

FIG. 2 illustrates various buffers and other structures within processor 100 in accordance with an embodiment of the present invention. These buffers and other structures include load buffer 201, store buffer 202, prefetch buffer 203 and L2 cache 204. All of these are well-known structures in existing processors. Load buffer 201, store buffer 202 and prefetch buffer 203 hold entries for load, store and prefetch instructions that are waiting to access slower portions of the memory hierarchy, such as L2 cache 204 and possibly main memory 124.

Also illustrated in FIG. 2 is deferred queue 112 (which also appears in FIG. 1). As was described above, deferred queue 112 stores deferred instructions 206, which are waiting for unresolved data dependencies to be resolved. In addition to storing deferred instructions, deferred queue 112 also stores corresponding operands 208 that have been resolved for the deferred instructions. When the deferred instructions 206 are finally executed in deferred mode, these deferred instructions 206 use the resolved source operands 208 from deferred queue 112, if such resolved operands were previously stored along with the instructions in the deferred queue 112. In this way, instructions following the deferred instructions that overwrite the resolved source operands will not create WAR hazards, because the deferred instructions will use the previously stored resolved operands 208 for the deferred instructions from deferred queue 112. This process is described in more detail below.

Keeping Track of Dependencies

The present invention keeps track of data dependencies in order to determine if an instruction is subject to an unresolved data dependency. In one embodiment of the present invention, this involves maintaining state information for each register, which indicates whether or not a value in the register depends on an unresolved data dependency.

Figure 3:
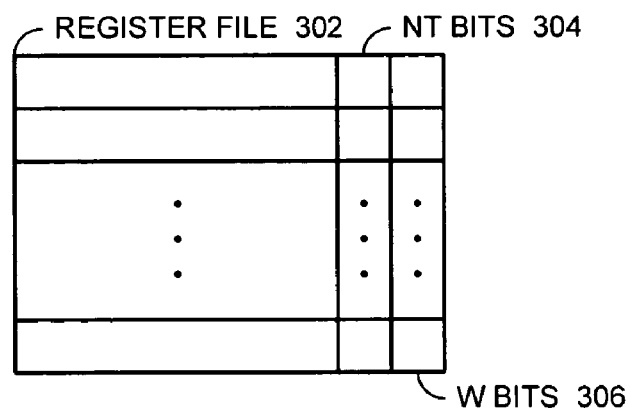
FIG. 3 illustrates a register file in accordance with an embodiment of the present invention.

For example, FIG. 3 illustrates a register file 302 in accordance with an embodiment of the present invention. Each register in register file 302 is associated with a "not-there" (NT) bit. During execute-ahead mode, the not-there bit keeps track of whether a valid operand value is contained in the register, or if the operand cannot be produced because of an unresolved data dependency. For example, if an instruction is waiting for a source operand to be produced by a load miss, the instruction is deferred and the not-there bit of the instruction's destination register is set to indicate that the desired result is not present in the destination register.

When a subsequent instruction references a source operand value that is marked as not-there, the system marks the destination register as not-there to indicate that the value in the destination register also depends on the unresolved data-dependency. This can be accomplished by marking the not-there bit of the destination register with the "OR" of the not-there bits for source registers of the instruction.

Each register in register file 302 is also associated with a "write" (W) bit. The write bit is used in the same way as the not-there bit, except that it is used during deferred mode, not execute-ahead node. During deferred mode, the write bit keeps track of whether a valid operand is contained in the register, or if the operand cannot be produced because of an unresolved data dependency.

Working Register File

Figure 4:
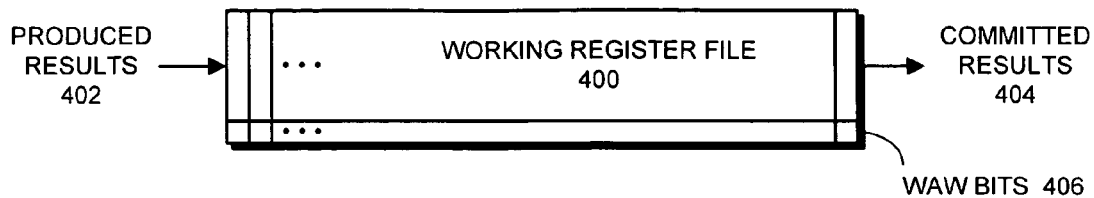
FIG. 4 illustrates a working register file in accordance with an embodiment of the present invention.

FIG. 4 illustrates a working register file 400 in accordance with an embodiment of the present invention. Working register file 400 is a structure commonly found in high-performance processors, which stores produced results of computational operations 402 before the results are committed to the architectural state of the processor and become committed results 404. Working register file 400 is used to forward results to become source operands for subsequent instructions in the execution pipeline, without having to wait until the results are committed to the architectural register file.

One embodiment of the present invention includes a WAW bit with each result stored in working register file 400. This WAW bit is set when there exists a WAW hazard for the associated result in working register file 400. If the WAW bit is set for a result, the result is forwarded to subsequent instructions in the pipeline through the working register file 400. However, when the result leaves working register file 400, the system examines the WAW bit and the result is not committed to the architectural state of the register file. This eliminates the WAW hazard because the register for which the result was destined is already (or will be) updated by a following (but previously executed) write operation. This process is described in more detail below.

Note that working register file 400 can be implemented as a first-in-first-out (FIFO) queue. This FIFO can advance based on the system clock signal. Or, alternatively, the FIFO can advance when results are loaded into the FIFO. Because results are not produced on every clock pulse, this alternative scheme allows results to stay within working register file 400 for a longer period of time.

State Diagram

Figure 5:
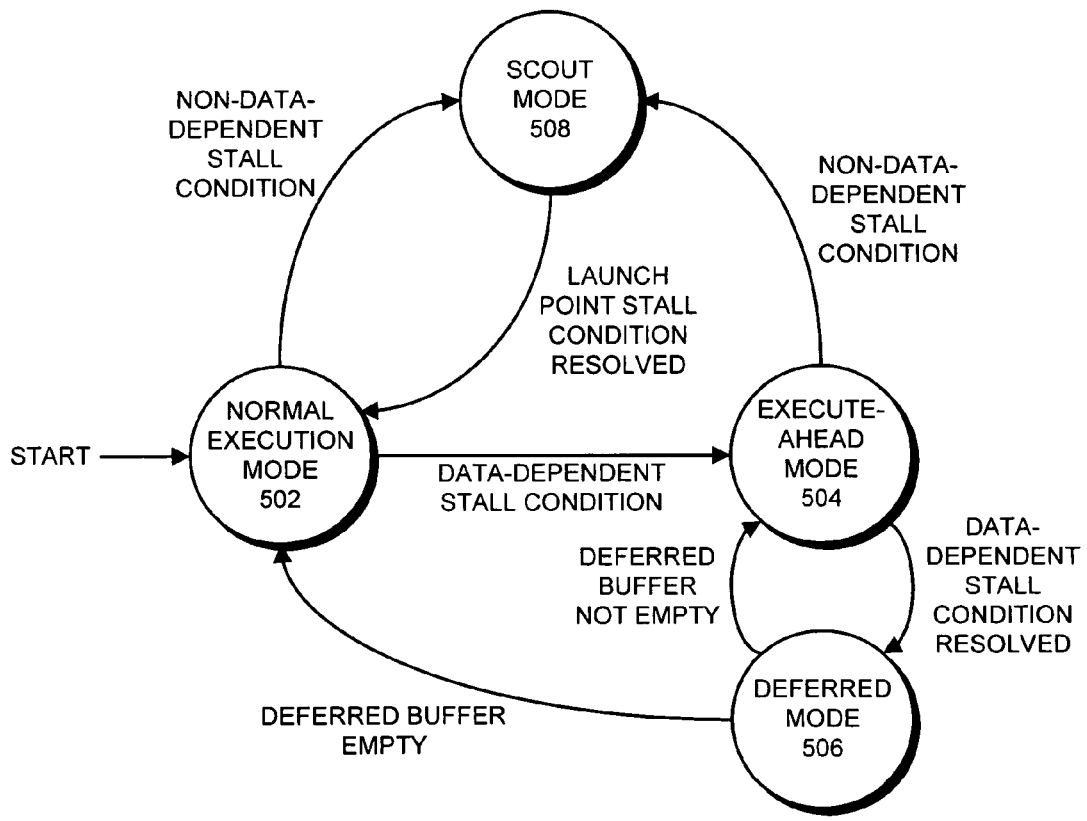
FIG. 5 presents a state diagram, which includes execute-ahead mode and scout mode, in accordance with an embodiment of the present invention.

FIG. 5 presents a state diagram which includes execute-ahead mode 504, deferred mode 506 and the scout mode 508 in accordance with an embodiment of the present invention. The system starts in normal execution mode 502, wherein instructions are executed in program order as they are issued from instruction buffer 108 (see FIG. 1).

Next, if an unresolved data dependency arises during execution of an instruction, the system moves to execute-ahead mode 504. An unresolved data dependency can include: a use of an operand that has not returned from a preceding load miss; a use of an operand that has not returned from a preceding translation lookaside buffer (TLB) miss; a use of an operand that has not returned from a preceding full or partial read-after-write (RAW) from store buffer operation; and a use of an operand that depends on another operand that is subject to an unresolved data dependency.

While moving to execute-ahead mode 504, the system generates a checkpoint that can be used, if necessary, to return execution of the process to the point where the unresolved data dependency was encountered; this point is referred to as the "launch point." (Generating the checkpoint involves saving the precise architectural state of processor 100 to facilitate subsequent recovery from exceptions that arise during execute-ahead mode 504 or deferred mode 506.) The system also "defers" execution of the instruction that encountered the unresolved data dependency by storing the instruction in deferred queue 112.

While operating in execute-ahead mode 504, the system continues to execute instructions in program order as they are received from instruction buffer 108; any instructions that cannot execute because of an unresolved data dependency are deferred into deferred queue 112.

During execute-ahead mode 504, if an unresolved data dependency is finally resolved, the system moves into deferred mode 506, wherein the system attempts to execute instructions from deferred queue 112 in program order. Note that the system attempts to execute these instructions in program order with respect to other deferred instructions in deferred queue 112, but not with respect to other previously executed non-deferred instructions (and not with respect to deferred instructions executed in previous passes through deferred queue 112). During this process, the system defers execution of deferred instructions that still cannot be executed because of unresolved data dependencies by placing these again-deferred instructions back into deferred queue 112. On the other hand, the system executes other instructions that can be executed in program order with respect to each other.

After the system completes a pass through deferred queue 112, if deferred queue 112 is empty, the system moves back into normal execution mode 502. This may involve committing changes made during execute-ahead mode 504 and deferred mode 506 to the architectural state of processor 100, if such changes have not been already committed. It can also involve throwing away the checkpoint generated when the system moved into execute-ahead mode 504.

On the other hand, if deferred queue 112 is not empty after the system completes a pass through deferred queue 112, the system returns to execute-ahead mode 504 to execute instructions from instruction buffer 108 from the point where the execute-ahead mode 504 left off.

If a non-data dependent stall condition arises while the system is in normal execution mode 502 or in execute-ahead mode 504, the system moves into scout mode 508. (This non-data-dependent stall condition can include a memory barrier operation, or a deferred queue full condition.) In scout mode 508, instructions are speculatively executed to prefetch future memory operations, but results are not committed to the architectural state of processor 100.

Scout mode 508 is described in more detail in a pending U.S. patent application entitled, "Generating Prefetches by Speculatively Executing Code Through Hardware Scout Threading," by inventors Shailender Chaudhry and Marc Tremblay, having Ser. No. 10/741,944, and filing date 19 Dec. 2003, which is hereby incorporated by reference to describe implementation details of scout mode 508.

Unfortunately, computational operations performed during scout mode 508 need to be recomputed again, which can require a large amount of computational work.

When the original "launch point" stall condition is finally resolved, the system moves back into normal execution mode 502, and, in doing so, uses the previously generated checkpoint to resume execution from the launch point instruction that encountered the launch point stall condition. The launch point stall condition is the stall condition that originally caused the system to move out of normal execution mode 502. For example, the launch point stall condition can be the data-dependent stall condition that caused the system to move from normal execution mode 502 to execute-ahead mode 504, before moving to scout mode 508. Alternatively, the launch point stall condition can be the non-data-dependent stall condition that caused the system to move directly from normal execution mode 502 to scout mode 508.

Processing an Instruction in Execute-Ahead Mode

Figure 6:
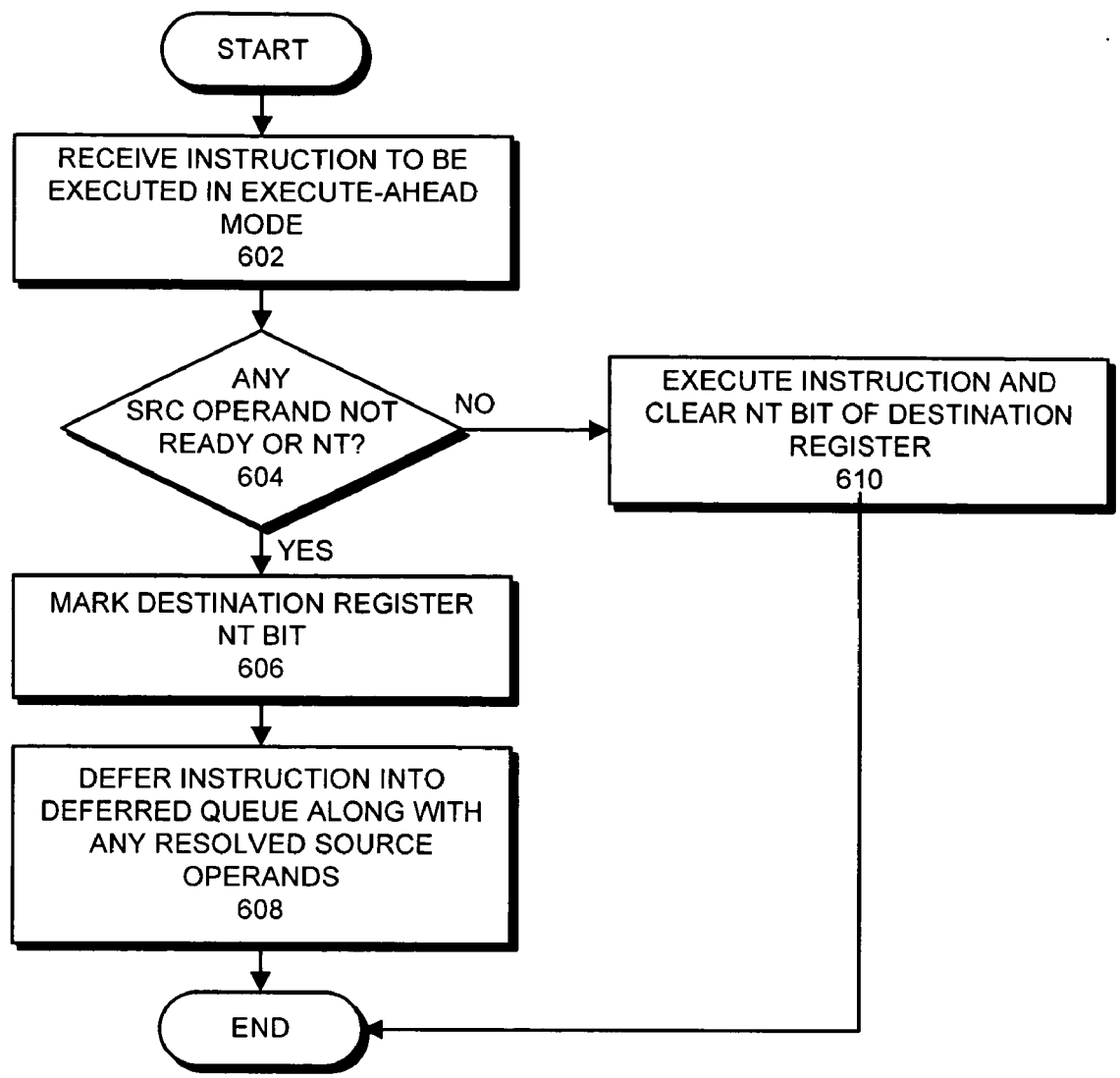
FIG. 6 presents a flow chart illustrating how an instruction is processed in execute-ahead mode in accordance with an embodiment of the present invention.

FIG. 6 presents a flow chart illustrating how an instruction is processed in execute-ahead mode in accordance with an embodiment of the present invention. The process starts when the system receives an instruction to be executed during execute-ahead mode (step 602).

Next, the system determines if any source operand for the instruction is "not ready" or is "not there" (step 604). A source operand is "not ready" if a memory reference has not returned a value for the source operand. For example, a source operand is not-ready if the operand has not returned from: a preceding load miss, a preceding translation lookaside buffer (TLB) miss, or a preceding full or partial read-after-write (RAW) from store buffer operation. A source operand is "not there" if the not-there bit of a register containing the source operand is set.

If any source operand for the instruction is not ready or is not there, the system marks the NT bit of the destination register for the instruction (step 606) and defers the instruction by placing the instruction in the deferred queue 112. Note that the instruction is placed into the deferred queue along with any source operands for the instruction which are resolved (step 608). This prevents WAR hazards as is described in more detail below.

On the other hand, if all source operands for the instruction are available, the system executes the instruction, and writes a result (if there is one) to the destination register. The system also clears the NT bit of the destination register to indicate that the value in the destination register has been resolved (step 610).

Processing an Instruction in Deferred Mode

Figure 7:
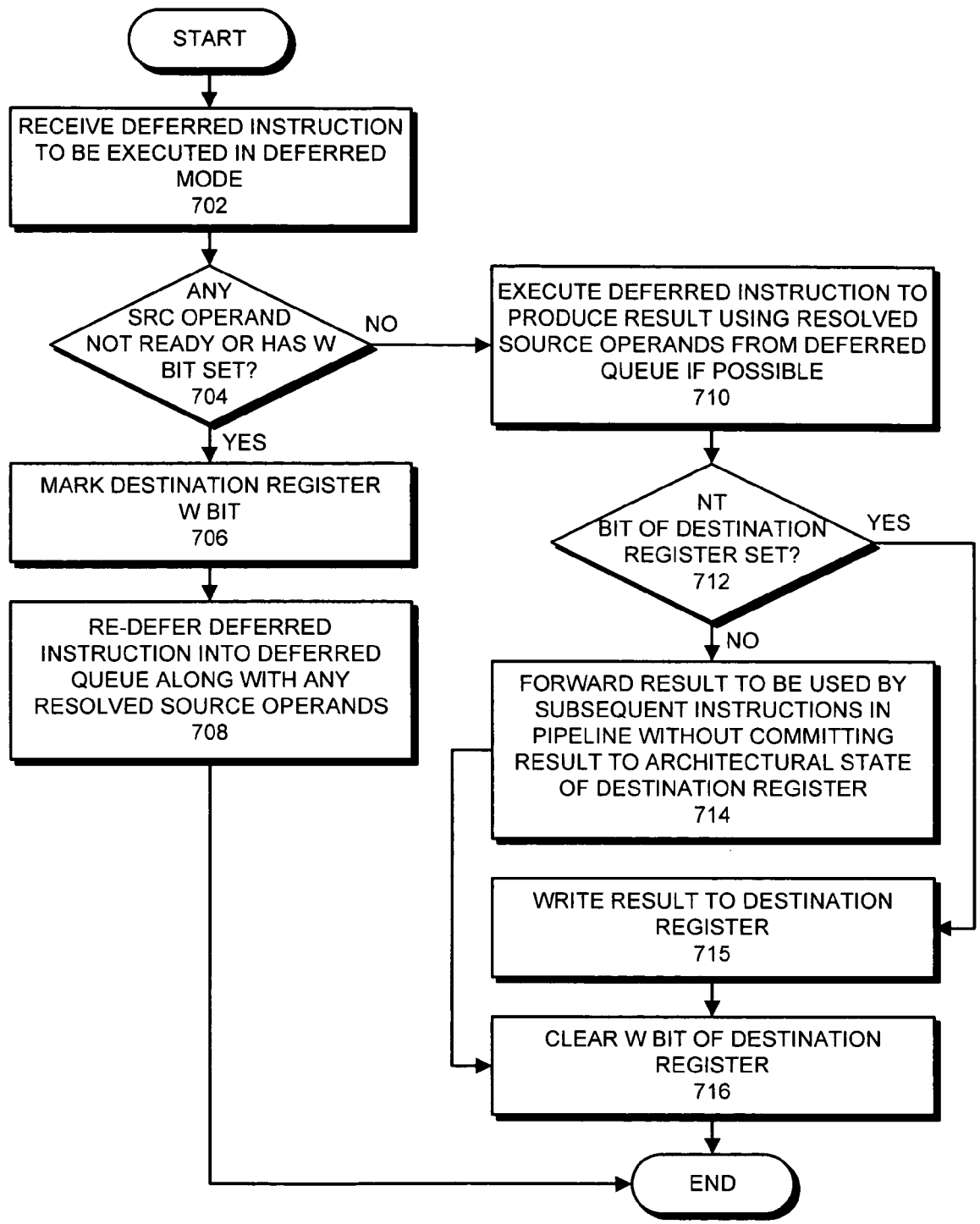
FIG. 7 presents a flow chart illustrating how an instruction is processed in deferred mode in accordance with an embodiment of the present invention.

FIG. 7 presents a flow chart illustrating how an instruction is processed in deferred mode in accordance with an embodiment of the present invention. The process starts when the system receives a deferred instruction to be executed during deferred mode (step 702).

Next, the system determines if any source operand for the deferred instruction is "not ready" or has its W bit set (step 704). (Recall that the W bit operates in the same way as the NT bit, except that the W bit is only used during deferred mode. Hence, all W bits are cleared before deferred mode starts, and W bits are only set during deferred mode.)

If any source operand for the deferred instruction is not ready or has a W bit that is set, the system marks the W bit of the destination register for the instruction (step 706). The system also re-defers the instruction by placing the instruction in the deferred queue 112 along with any resolved source operands (in order to prevent WAR hazards) (step 708).

On the other hand, if all source operands for the deferred instruction are available, the system executes the deferred instruction using any resolved source operands that are available in the deferred queue (step 710). This avoids a WAR hazard because after a resolved operand is written into the deferred queue along with a deferred instruction, the architectural register containing the resolved operand can be overwritten by an instruction, which follows the deferred instructed in program order but is executed before the deferred instruction, without affecting the source operand from the deferred queue that is used by the deferred instruction.

In order to avoid a WAW hazard, the system determines if the NT bit of the destination register is set (step 712). If so, a WAW hazard does not exist, and the system writes the result produced by the deferred instruction (if there is one) to the destination register (step 715). The system also clears the W bit of the destination register (step 716).

Otherwise, if the NT bit of the destination register is not set, a WAW hazard exists because a non-deferred instruction following the deferred instruction in program order has updated the destination register before the deferred instruction executes. In this case, the system forwards the produced result to be used by subsequent instructions in the pipeline, but in doing so sets the WAW bit for the result in the working register file 400 (illustrated in FIG. 4). This causes the produced result not to be committed to the architectural state of the destination register for the deferred instruction and thereby avoids the WAW hazard (step 714). The system then proceeds to step 716 to clear the W bit of the destination register.

Note that even if the NT bit of the destination register was found to be set in step 712, the destination register may have been cleared by a non-deferred instruction following the deferred instruction in program order before the deferred instruction executed. However, this is not a problem because the NT bit must have been subsequently set again by a second deferred instruction that follows the non-deferred instruction in program order and that entered the deferred queue after the deferred instruction did. This second deferred instruction will subsequently rewrite the destination register after the deferred instruction does, thereby eliminating the WAW hazard.

Updating Dependency Information at the End of Deferred Mode

Figure 8:
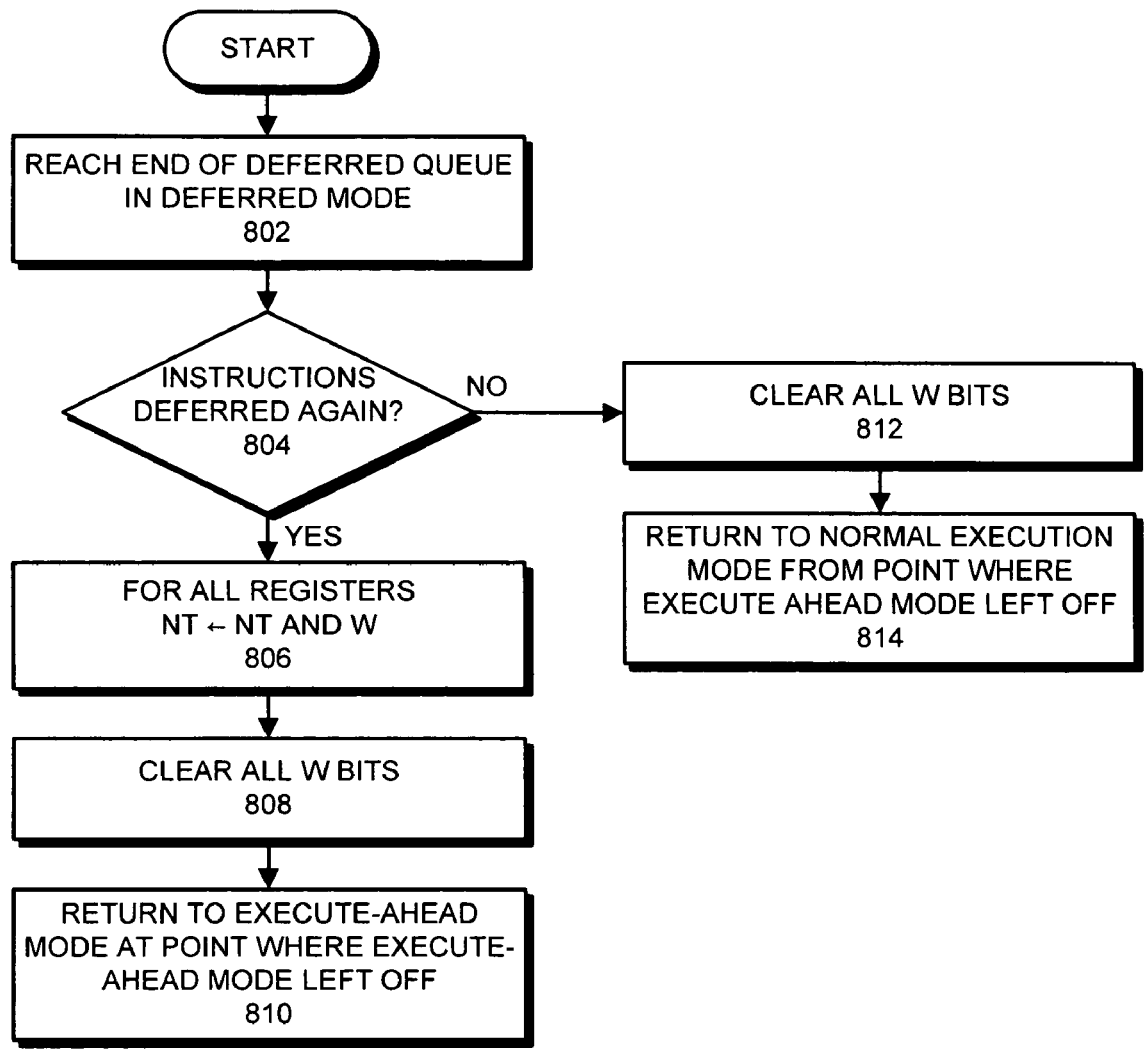
FIG. 8 presents a flow chart illustrating how dependency information is updated at the end of deferred mode in accordance with an embodiment of the present invention.

FIG. 8 presents a flow chart illustrating how dependency information is updated at the end of deferred mode in accordance with an embodiment of the present invention. This process starts when the system reaches the end of the deferred queue in deferred mode (step 802). At this point, the system determines if any instructions have been deferred again (step 804).

If not, speculative execution as successful and the system performs a join operation, which involves clearing all W bits from the registers (step 812) and returning to normal execution mode at the point where execute-ahead mode left off (step 814).

Otherwise, if some deferred instructions remain, the system performs a merge operation. This involves updating the NT bits for each register with the AND of the NT and W bits for the register (step 806). It also involves clearing all W bits (step 808). The system then returns the execute-ahead mode at the point where execute ahead mode left off to enter deferred mode (step 810).

Example WAW Hazard

Consider the following sequence of code
(1) ldx [address1], % r7
(2) add % r7, 4, % r8
(3) stx % r8, [address2]
(4) sethi 1, % r8
(5) stx % r8, [address3]

If the ldx (load) instruction (1) requires many cycles to retrieve the data from memory, the system defers dependent instructions (2) and (3) to be executed later, and executes independent instructions (4) and (5) first. After the load returns, the system executes instructions (2) and (3). However, the value of register % r8 that is used for instructions following instruction (5) should be set by instruction (4). This must be true despite the fact that instruction (2) was executed (in time) after instruction (4).

In this example, because instruction (2) has to wait for source operand % r7 to return from load instruction (1), the system enters execute-ahead mode and instruction (2) is deferred. The NT bit of % r8 is set by instruction (2) because instruction (2) is waiting for the source operand % r7 to return from the load in instruction (1). Instruction (3) is also deferred because the NT bit of the source operand % r8 is set. As execute-ahead mode proceeds, instruction (4) is executed. During execution, instruction (4) writes a new value into % r8 and clears the NT bit of % r8. Instruction (5) also executes, because the source operand in % r8 is present.

When the load in instruction (1) returns, the system enters deferred mode and executes instruction (2), which is able to complete because % r7 is now valid (since the load returned). When instruction (2) executes, it clears the W bit for % r8. However, observe that the NT bit for % r8 is clear because it was cleared by instruction (4). In this case, a WAW hazard exists for % r8 because % r8 has already been written by instruction (4), which follows instruction (2) in program order. In order to deal with this WAW hazard, the system does not write the value of % r8 computed by instruction (2) into the architectural register file. It merely forwards the value to instruction (3) so that instruction (3) stores the correct data and then drops the value. Architectural register % r8 thus retains the value that was computed by (4).

At this point the system has executed all instructions that have been deferred, so the system execute-ahead mode is complete. The system clears all of the NT and W bits and returns to normal execution mode.

On the other hand, if instructions remain in the deferred queue (perhaps dependent on other loads), the system merges the W bits set during the deferred mode into the NT bits. This can be accomplished by updating the NT bits with the AND of the NT and W bits. All the W bits are cleared.

RAW Hazard

The above example can also be used to illustrate how a RAW hazard is avoided by deferring instructions. Note that a traditional in-order processor does not defer instructions. Thus, the RAW problem is more easily solved because the dependency graph does not grow beyond the first dependency. An in-order processor stalls upon encountering (i) a first load miss, or (ii) the first consumer of a load miss. In the example above, the processor could stall on the load miss in instruction (1) or on the add in instruction (2). The latter ability is enabled by a scoreboard which tracks register destinations for outstanding loads.

In a traditional out-of-order processor, each entry in the issue queue contains a "ready" bit for each source operand. When the producer instruction has executed, the ready bit for the appropriate operand of the consumer instruction is set. The consumer instruction is then allowed to issue when its ready bits are all set. However, as discussed above, an issue queue for an out-of-order processor cannot easily be increased in size past 128 entries.

The present invention avoids RAW hazards by deferring instructions that are subject to unresolved data dependencies, and allowing other instructions without dependencies to proceed. An instruction is deferred for later execution if any of its source operands are either: (i) produced by a memory reference that has not returned (such as a load miss); or (ii) have their NT bit set. Recall that the NT bit of a register is set whenever the register is the destination of a deferred instruction. Furthermore, the NT bit is cleared whenever the register is a destination of a non-deferred instruction.

In the previous example, instruction (2) is the first deferred instruction since its source operand % r7 is produced by a load that missed the cache. Thus, destination % r8 is marked as NT. Instruction (3) is also deferred because the source operand % r8 is marked as NT. Instructions (4) and (5) have no unresolved data dependencies, so they are able to complete. At a later time, when the load from instruction (1) finally returns, instructions (2) and (3) are able to complete. Notice that the system avoids RAW hazards by deferring execution of instructions with unresolved data dependencies.

Example WAR Hazard

Consider the following sequence of code
(1) ldx [0x1000], % r1
(2) sethi 0x2, % r2
(3) add % r1, % r2, % r3
(4) st % r3, [0x4000]
(5) sethi 0x5, % r2
(6) sub % r1, % r2, % r6

Assume that the ldx (load) instruction (1) causes a cache miss. Then, the add instruction (3) is the first deferred instruction. The stx (store) instruction (4) is also deferred since it depends on the result of the add. Of course, the sethi instructions are never deferred because they do not have any source operands and, thus, cannot depend on a producer. The sub instruction (6) is also deferred because it depends on the load instruction (1).

We now have three deferred instructions (3), (4) and (6). Also note that the value of % r2 is 0x1400 (0x5 <<10). Eventually, the load data returns from the memory system and the deferred instructions are executed. During this execution, the add instruction (3) must use the value 0x800 (0x2<<10) for % r2, and the sub instruction (6) must use the value 0x1400 (0x5<<10) for % r2. In this case, a WAR hazard exists because the value 0x800 (0x2<<10) written to % r2 by instruction (2) has been overwritten with the value 0x1400 (0x5<<10) by instruction (5) before instruction (3) executes.

A traditional in-order processor does not defer instructions. Thus, there can be no WAR hazard, since the processor will stall at or before reaching the first consumer instruction that is not data-ready.

A traditional out-of-order processor solves the WAR problem by register renaming, which ensures that destination registers for different instructions are mapped to unique physical registers, even if they are directed to the same architectural register. However, as was noted above, register renaming introduces hardware complexity that does not scale well for larger issue queues.

One embodiment of the present invention avoids WAR hazards by storing source operands that have been resolved in the deferred queue along with corresponding deferred instructions. When the deferred instructions are finally executed in deferred mode, these deferred instructions use resolved source operands from the deferred queue, if such resolved operands were previously stored along with the instructions in the deferred queue. In this way, instructions following the deferred instructions that overwrite the resolved source operands cannot create WAR hazards because the deferred instructions use the previously stored resolved operands for the deferred instructions from the deferred queue.

In the example above, the add instruction (3) is deferred since % r1 is not ready. The other source register, % r2, is ready, so its current value, 0x800, is placed in the deferred queue along with the add instruction (3). The store instruction (4) is also placed into the deferred queue along with its immediate address 0x4000. Now, the second sethi instruction (5) executes and changes the value of % r2 to 0x1400. Then the sub instruction (6) is also deferred and 0x1400 is stored along with it in the deferred queue.

Eventually, the load from instruction (1) returns its data to the pipeline and the data is written to % r1. The deferred instructions can now execute. First, the add instruction (3) executes and in doing so receives % r1 via the bypass path and receives the correct value for % r2 from the deferred queue. The store instruction (4) receives % r3 via the bypass path from the add instruction (3) and receives its address from the value stored in the deferred queue. Finally, the sub instruction (6) receives % r1 via the bypass path and receives the correct % r2 from the deferred queue.

Note that instructions that execute from the deferred queue get their data from a number of sources, including: (i) the deferred queue, (ii) load data that has just returned, or (iii) other deferred instructions that have just executed. There is no WAR hazard in cases (ii) or (iii) since the deferred instructions are executed in-order with respect to each other. The WAR hazard only exists if a deferred instruction needs to use data that has been overwritten by a following instruction in program order, which has executed earlier in time. This hazard is avoided by retrieving data from (i) the deferred queue.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for avoiding write-after-write (WAW) hazards while speculatively executing instructions on a processor in an execute-ahead mode, comprising:

issuing instructions for execution in program order during a normal execution mode;

upon encountering an unresolved data dependency during execution of an instruction, generating a checkpoint, deferring the instruction, and executing subsequent instructions in the execute-ahead mode, wherein instructions that cannot be executed because of unresolved data dependencies are deferred, wherein other non-deferred instructions are executed in program order, and wherein dependency information is maintained for each register indicating whether or not a value in the register depends on an unresolved data dependency;

if an unresolved data dependency is resolved during the execute-ahead mode, executing deferred instructions in a deferred mode, wherein deferred instructions that are able to be executed are executed in program order, and other deferred instructions that still cannot be executed because of unresolved data dependencies are deferred again; and while executing a deferred instruction, if dependency information for an associated destination register indicates that a WAW hazard potentially exists with a following non-deferred instruction, the method further comprises executing the deferred instruction to produce a result, and forwarding the result to be used by subsequent instructions in a pipeline and/or deferred queue for the processor, without committing the result to the architectural state of the destination register, thereby making the result available to the subsequent instructions without overwriting a result produced by the following non-deferred instruction.

2. The method of claim 1, wherein the dependency information maintained for each register includes a "not-there" bit, which indicates whether or not a value to be stored in the register by a preceding instruction is subject to an unresolved data dependency and is consequently not available; and wherein while executing an instruction during the execute-ahead mode, the not-there bit of a destination register for the instruction is set if a value to be stored in the destination register is "not-ready," or if any source operand of the instruction is not-there.

3. The method of claim 2, wherein the dependency information maintained for each register also includes a "write" bit, which is used to indicate whether or not a value to be stored in the register during the deferred mode is subject to an unresolved data dependency; and wherein while executing a deferred instruction during the deferred mode, the write bit of the destination register for the instruction is set if a value to be stored in the destination register is "not-ready," or if any source operand of the instruction has a write bit that is set.

4. The method of claim 3, wherein dependency information for the destination register indicates that a WAW hazard potentially exists if the not-there bit of the destination register is clear, indicating that a following (but previously executed) non-deferred instruction must have cleared the not-there bit because the not-there bit was previously set when the deferred instruction was initially deferred, in which case a WAW hazard potentially exists between the deferred instruction and the following non-deferred instruction.

5. The method of claim 3, wherein an operand is not-ready if the operand has not returned from:
   a preceding load miss;
   a preceding translation lookaside buffer (TLB) miss; or
   a preceding full or partial read-after-write (RAW) from store buffer operation.

6. The method of claim 3,
   wherein if some deferred instructions are deferred again, the method further comprises:
   updating the not-there bit of each register with the AND of the not-there bit and the write bit of the register;
   clearing the write bit of each register; and
   returning to execute-ahead mode at the point where execute-ahead mode left off.

7. The method of claim 1, wherein deferring an instruction involves inserting the instruction into a deferred queue, which contains deferred instructions in program order.

8. The method of claim 1, wherein if all deferred instructions are executed in the deferred mode, the method further comprises returning to the normal execution mode to resume normal program execution from the point where the execute-ahead mode left off.

9. The method of claim 1, wherein if a non-data-dependent stall condition is encountered in normal execution mode, the method further comprises:
   generating a checkpoint that can subsequently be used to return execution of the program to the point of the non-data-dependent stall condition;
   entering a scout mode, wherein instructions are speculatively executed to prefetch future memory operations, but wherein results are not committed to the architectural state of the processor; and
   when the non-data-dependent stall condition that caused the processor to move out of normal execution mode is finally resolved, using the checkpoint to resume execution in normal execution mode from the instruction that originally encountered the non-data-dependent stall condition.

10. The method of claim 1, wherein if a non-data-dependent stall condition is encountered in execute-ahead mode, the method further comprises:
    entering a scout mode, wherein instructions are speculatively executed to prefetch future memory operations, but wherein results are not committed to the architectural state of the processor; and
    when the unresolved data dependency that originally caused the processor to move out of normal execution mode is finally resolved, using the checkpoint to resume execution in normal execution mode from the instruction that originally encountered the unresolved data dependency.

11. The method of claim 1, wherein generating the checkpoint involves saving a precise architectural state of the processor to facilitate subsequent recovery from exceptions that arise during the execute-ahead mode or the deferred mode.

12. The method of claim 1, wherein the unresolved data dependency can include:
    a use of an operand that has not returned from a preceding load miss;
    a use of an operand that has not returned from a preceding translation lookaside buffer (TLB) miss;
    a use of an operand that has not returned from a preceding full or partial read-after-write (RAW) from store buffer operation; and
    a use of an operand that depends on another operand that is subject to an unresolved data dependency.

13. An apparatus that avoids write-after-write (WAW) hazards while speculatively executing instructions on a processor in an execute-ahead mode, comprising:
    an issuing mechanism configured to issue instructions for execution in program order during a normal execution mode; and
    an execution mechanism;
    wherein upon encountering an unresolved data dependency during execution of an instruction, the execution mechanism is configured to generate a checkpoint, defer the instruction, and execute subsequent instructions in the execute-ahead mode, wherein instructions that cannot be executed because of unresolved data dependencies are deferred, wherein other non-deferred instructions are executed in program order, and wherein dependency information is maintained for each register indicating whether or not a value in the register depends on an unresolved data dependency;
    wherein if an unresolved data dependency is resolved during the execute-ahead mode, the execution mechanism is configured to execute deferred instructions in a deferred mode, wherein deferred instructions that are able to be executed are executed in program order, and other deferred instructions that still cannot be executed because of unresolved data dependencies are deferred again; and
    wherein while executing a deferred instruction, if dependency information for an associated destination register indicates that a WAW hazard potentially exists with a following non-deferred instruction, the execution mechanism is configured to execute the deferred instruction to produce a result, and to forward the result to be used by subsequent instructions in a pipeline and/or deferred queue for the processor, without committing the result to the architectural state of the destination register, thereby making the result available to the subsequent instructions without overwriting a result produced by the following non-deferred instruction.

14. The apparatus of claim 13,
    wherein the dependency information maintained for each register includes a "not-there" bit, which indicates whether or not a value to be stored in the register by a preceding instruction is subject to an unresolved data dependency and is consequently not available; and
    wherein while executing an instruction during the execute-ahead mode, the not-there bit of a destination register for the instruction is set if a value to be stored in the destination register is "not-ready," or if any source operand of the instruction is not-there.

15. The apparatus of claim 14,
    wherein the dependency information maintained for each register also includes a "write" bit, which is used to indicate whether or not a value to be stored in the register during the deferred mode is subject to an unresolved data dependency; and
    wherein while executing a deferred instruction during the deferred mode, the write bit of the destination register for the instruction is set if a value to be stored in the destination register is "not-ready," or if any source operand of the instruction has a write bit that is set.

16. The apparatus of claim 15, wherein dependency information for the destination register indicates that a WAW hazard potentially exists if the not-there bit of the destination register is clear, indicating that a following (but previously executed) non-deferred instruction must have cleared the not-there bit because the not-there bit was previously set when the deferred instruction was initially deferred, in which case a WAW hazard potentially exists between the deferred instruction and the following non-deferred instruction.

17. The apparatus of claim 15, wherein an operand is not-ready if the operand has not returned from:
   a preceding load miss;
   a preceding translation lookaside buffer (TLB) miss; or
   a preceding full or partial read-after-write (RAW) from store buffer operation.

18. The apparatus of claim 15, wherein if some deferred instructions are deferred again, the execution mechanism is configured to:
   update the not-there bit of each register with the AND of the not-there bit and the write bit of the register;
   clear the write bit of each register; and to
   return to execute-ahead mode at the point where execute-ahead mode left off.

19. The apparatus of claim 13, wherein deferring an instruction involves inserting the instruction into a deferred queue, which contains deferred instructions in program order.

20. The apparatus of claim 13, wherein if all deferred instructions are executed in the deferred mode, the execution mechanism is configured to return to the normal execution mode to resume normal program execution from the point where the execute-ahead mode left off.

21. The apparatus of claim 13, wherein if a non-data-dependent stall condition is encountered in normal execution mode, the execution mechanism is configured to:
   generate a checkpoint that can subsequently be used to return execution of the program to the point of the non-data-dependent stall condition;
   enter a scout mode, wherein instructions are speculatively executed to prefetch future memory operations, but wherein results are not committed to the architectural state of the processor; and
   when the non-data-dependent stall condition that caused the processor to move out of normal execution mode is finally resolved, to use the checkpoint to resume execution in normal execution mode from the instruction that originally encountered the non-data-dependent stall condition.

22. The apparatus of claim 13, wherein if a non-data-dependent stall condition is encountered in execute-ahead mode, the execution mechanism is configured to:
   enter a scout mode, wherein instructions are speculatively executed to prefetch future memory operations, but wherein results are not committed to the architectural state of the processor; and
   when the unresolved data dependency that originally caused the processor to move out of normal execution mode is finally resolved, to use the checkpoint to resume execution in normal execution mode from the instruction that originally encountered the unresolved data dependency.

23. The apparatus of claim 13, wherein generating the checkpoint involves saving a precise architectural state of the processor to facilitate subsequent recovery from exceptions that arise during the execute-ahead mode or the deferred mode.

24. The apparatus of claim 13, wherein the unresolved data dependency can include:
   a use of an operand that has not returned from a preceding load miss;
   a use of an operand that has not returned from a preceding translation lookaside buffer (TLB) miss;
   a use of an operand that has not returned from a preceding full or partial read-after-write (RAW) from store buffer operation; and
   a use of an operand that depends on another operand that is subject to an unresolved data dependency.

25. A computer system that avoids write-after-write (WAW) hazards while speculatively executing instructions on in an execute-ahead mode, comprising:
   a processor;
   a memory;
   an issuing mechanism within the processor configured to issue instructions for execution in program order during a normal execution mode; and
   an execution mechanism within the processor;
   wherein upon encountering an unresolved data dependency during execution of an instruction, the execution mechanism is configured to generate a checkpoint, to defer the instruction, and to execute subsequent instructions in the execute-ahead mode, wherein instructions that cannot be executed because of unresolved data dependencies are deferred, wherein other non-deferred instructions are executed in program order, and wherein dependency information is maintained for each register indicating whether or not a value in the register depends on an unresolved data dependency;
   wherein if an unresolved data dependency is resolved during the execute-ahead mode, the execution mechanism is configured to execute deferred instructions in a deferred mode, wherein deferred instructions that are able to be executed are executed in program order, and other deferred instructions that still cannot be executed because of unresolved data dependencies are deferred again; and
   wherein while executing a deferred instruction, if dependency information for an associated destination register indicates that a WAW hazard potentially exists with a following non-deferred instruction, the execution mechanism is configured to execute the deferred instruction to produce a result, and to forward the result to be used by subsequent instructions in a pipeline and/or deferred queue and/or deferred queue for the processor, without committing the result to the architectural state of the destination register, thereby making the result available to the subsequent instructions without overwriting a result produced by the following non-deferred instruction.

* * * * *